United States Patent
Kim et al.

(10) Patent No.: US 12,379,453 B2
(45) Date of Patent: Aug. 5, 2025

(54) USER TERMINAL AND METHOD WITH ULTRA WIDE BAND NETWORK CONFIGURATION

(71) Applicant: SAMSUNG ELECTRONICS CO., LTD., Suwon-si (KR)

(72) Inventors: Hanjun Kim, Suwon-si (KR); Heesae Lee, Ansan-si (KR); Hyun Cheol Jeon, Suwon-si (KR); Seokpyo Hong, Suwon-si (KR); Junhwan Lee, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 17/825,598

(22) Filed: May 26, 2022

(65) Prior Publication Data
US 2023/0184878 A1    Jun. 15, 2023

(30) Foreign Application Priority Data
Dec. 15, 2021    (KR) .................... 10-2021-0179763

(51) Int. Cl.
*G01S 5/02*    (2010.01)
*G01S 5/14*    (2006.01)
*H04W 4/02*    (2018.01)

(52) U.S. Cl.
CPC .............. *G01S 5/0284* (2013.01); *G01S 5/14* (2013.01); *H04W 4/023* (2013.01)

(58) Field of Classification Search
CPC .......... G01S 5/0284; G01S 5/14; G01S 13/74; G01S 5/0247; G01S 5/0289; G01S 13/0209; H04W 4/023; H04W 84/18; H04W 4/08; H04W 4/80; H04W 8/005; H04W 12/06; H04W 12/63; H04W 88/02
See application file for complete search history.

(56) References Cited

U.S. PATENT DOCUMENTS

| | | | |
|---|---|---|---|
| 7,031,875 B2 | 4/2006 | Ellenby et al. | |
| 7,248,841 B2 | 7/2007 | Agee et al. | |
| 10,551,479 B1 * | 2/2020 | Ylamurto | H04W 4/029 |

(Continued)

FOREIGN PATENT DOCUMENTS

| | | |
|---|---|---|
| KR | 10-0776682 B1 | 11/2007 |
| KR | 10-0957215 B1 | 5/2010 |

(Continued)

*Primary Examiner* — Lester G Kincaid
*Assistant Examiner* — Abdullah Al Mamun
(74) *Attorney, Agent, or Firm* — NSIP Law

(57) ABSTRACT

An operating method of a user terminal, the operating method includes: configuring a first ultra-wide band (UWB) network corresponding to a target user based on first objects including the user terminal dependent on the target user, a UWB communication module including any one or any combination of any two or more of a UWB sensor, a UWB antenna, and a UWB tag; searching for a second UWB network corresponding to a multi-user adjacent to the first UWB network; obtaining, based on a result of the searching, relative position information between the target user and the multi-user by connecting the first UWB network to the second UWB network; and performing, based on the relative position information, interaction and information sharing between the target user and the multi-user.

16 Claims, 12 Drawing Sheets

(56) References Cited

U.S. PATENT DOCUMENTS

| | | | |
|---|---|---|---|
| 10,642,560 B2 | 5/2020 | Hill et al. | |
| 10,785,629 B1* | 9/2020 | Patel | H04L 67/63 |
| 11,506,746 B1* | 11/2022 | Vassilovski | H04W 72/20 |
| 2005/0176429 A1* | 8/2005 | Lee | H04W 36/00835 |
| | | | 455/436 |
| 2006/0218225 A1* | 9/2006 | Hee Voon | G06Q 30/02 |
| | | | 709/201 |
| 2010/0148954 A1* | 6/2010 | Bobier | H04W 4/02 |
| | | | 340/539.11 |
| 2012/0079092 A1* | 3/2012 | Woxblom | H04L 65/80 |
| | | | 709/223 |
| 2012/0275444 A1* | 11/2012 | Shahsavari | H04L 65/4061 |
| | | | 370/338 |
| 2015/0119074 A1* | 4/2015 | Holz | G01S 1/66 |
| | | | 455/456.1 |
| 2015/0334550 A1* | 11/2015 | Klatt | H04W 4/80 |
| | | | 455/434 |
| 2016/0238692 A1* | 8/2016 | Hill | G01S 5/14 |
| 2017/0123039 A1* | 5/2017 | Shin | G01S 5/10 |
| 2019/0182454 A1* | 6/2019 | Berger | G16H 30/40 |
| 2019/0380005 A1* | 12/2019 | Eashwaramoorthy | H04W 4/08 |
| 2020/0329341 A1* | 10/2020 | Kuber | H04B 17/318 |
| 2021/0025727 A1* | 1/2021 | Barnes | G06T 7/73 |
| 2021/0055746 A1* | 2/2021 | Jeong | G05D 1/0016 |
| 2021/0142667 A1* | 5/2021 | Choi | G08G 1/0969 |
| 2021/0241551 A1* | 8/2021 | Loeshelle | G07C 9/00182 |
| 2022/0007253 A1* | 1/2022 | Albero | H04L 43/0811 |
| 2022/0053283 A1* | 2/2022 | Beaurepaire | H04W 4/029 |
| 2022/0181887 A1* | 6/2022 | Baldasare | G08B 21/182 |
| 2022/0201434 A1* | 6/2022 | Nguyen | H04W 4/029 |
| 2022/0301371 A1* | 9/2022 | Tertinek | H04W 12/06 |
| 2023/0319724 A1* | 10/2023 | Kang | H04W 8/005 |
| | | | 370/318 |

FOREIGN PATENT DOCUMENTS

| | | |
|---|---|---|
| KR | 10-2011-0072108 A | 6/2011 |
| KR | 10-2011-0123167 A | 11/2011 |
| KR | 10-2014-0058983 A | 5/2014 |
| KR | 10-2015-0120755 A | 10/2015 |
| KR | 10-2018-0042546 A | 4/2018 |
| KR | 10-2021-0031153 A | 4/2021 |
| KR | 10-2284464 B1 | 8/2021 |
| WO | WO 2020/210268 A1 | 10/2020 |

* cited by examiner

USER TERMINAL AND METHOD WITH ULTRA WIDE BAND NETWORK CONFIGURATION

CROSS-REFERENCE TO RELATED APPLICATIONS

This application claims the benefit under 35 USC § 119(a) of Korean Patent Application No. 10-2021-0179763, filed on Dec. 15, 2021, in the Korean Intellectual Property Office, the entire disclosure of which is incorporated herein by reference for all purposes.

BACKGROUND

1. Field

The following disclosure relates to a user terminal and method with an ultra-wide band (UWB) network configuration.

2. Description of Related Art

As an example, for a user wearing a user device, such as an augmented reality (AR) device, to experience various interface techniques, position information on where the user is currently located may need to be identified first. Techniques, such as localization or simultaneous localization and mapping (SLAM), may be used to obtain the position information of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of a user terminal, the operating method includes: configuring a first ultra-wide band (UWB) network corresponding to a target user based on first objects including the user terminal dependent on the target user, a UWB communication module including any one or any combination of any two or more of a UWB sensor, a UWB antenna, and a UWB tag; searching for a second UWB network corresponding to a multi-user adjacent to the first UWB network; obtaining, based on a result of the searching, relative position information between the target user and the multi-user by connecting the first UWB network to the second UWB network; and performing, based on the relative position information, interaction and information sharing between the target user and the multi-user.

The configuring of the first UWB network may include setting the first objects to first nodes, and configuring the first UWB network using a first graph setting connection relationships between the first objects to first edges of the first graph.

Each of the user terminal and at least one of the first objects may include three or more UWB antennas. The configuring of the first UWB network may further include estimating a relative position between the user terminal and the first objects using the three or more UWB antennas of the user terminal and the at least one of the first objects, and setting the first objects to the first nodes based on the relative position, and generating the first graph.

The configuring of the first UWB network may further include generating the first nodes of the first graph corresponding to the first UWB network using the first objects, registering information corresponding to the target user and the first objects as information of the first nodes by classifying the information corresponding to the target user and the first objects, and configuring the first UWB network by generating the first edges of the first graph, based on connection relationships between the first objects and the information of the first nodes.

The searching for the second UWB network may include searching for the second UWB network by modifying information of first nodes by allowing access to the relative position information of the first nodes.

The second UWB network may set second objects dependent on the multi-user to second nodes. The second objects may include either one or both of a UWB sensor and a UWB tag, and the second UWB network may be configured by a second graph setting connection relationships between the second objects to second edges of the second graph.

The obtaining of the relative position information may include generating third edges setting connection relationships between the first nodes and the second nodes, based on relative positions between the first nodes and the second nodes, and connecting the first UWB network to the second UWB network by connecting the second nodes to the first nodes of the first graph by the third edges.

The connecting of the first UWB network to the second UWB network may include registering information on the second nodes and information on the multi-user as information of the first graph, based on disclosure of the information on the second nodes connected to the first nodes and the information on the multi-user.

The operating method may further include modifying the information on the second nodes and the information on the multi-user.

The obtaining of the relative position information may include adjusting the relative position information between the target user and the multi-user, based on relative positions between the first nodes and the second nodes.

The performing of the interaction and information sharing may include performing, based on the relative position information, authentication on any one of the target user, the first objects, and second objects; providing, based on the relative position information, a position-based service to the target user; generating, based on the relative position information, a community between the target user and the multi-user; providing, based on the relative position information, a conversation service between the target user and the multi-user; providing, based on the relative position information, announcement information to the target user and the multi-user; and displaying, based on the relative position information, information of any one of the target user and the multi-user.

The searching for the second UWB network may further include obtaining absolute position information of the target user from a base station serving the user terminal, and searching, based on position information of the target user, for the second UWB network for the multi-user.

The performing of the interaction and information sharing may further include determining based on the absolute position information of the target user, an absolute position of the target user and an absolute position of the multi-user using a map, and performing the interaction and information sharing between the target user and the multi-user using the absolute position of the target user and the absolute position of the multi-user.

The first objects may include any one or any combination of any two or more of a head mounted display (HMD) in which the UWB communication module is installed, a smart glass, a mobile device, a wearable device, and an internet of things (IoT) device in which the UWB tag is installed.

A non-transitory computer-readable storage medium may store instructions that, when executed by a processor, cause the processor to perform the method above.

In another general aspect, a user terminal includes an ultra-wide band (UWB) communication module including any one or any combination of any two or more of a UWB sensor, a UWB antenna, and a UWB tag, and a processor. The processor is configured to: configure a first UWB network corresponding to a target user based on first objects comprising the user terminal dependent on the target user, and the UWB communication module; search for a second UWB network for a multi-user around the first UWB network; obtain, based on a result of the search, relative position information between the target user and the multi-user by connecting the first UWB network to the second UWB network; and perform, based on the relative position information, interaction and information sharing between the target user and the multi-user.

The processor may be further configured to set the first objects to first nodes, and configure the first UWB network using a first graph setting connection relationships between the first objects to first edges of the first graph.

Each of the user terminal and at least one of the first objects may include three or more UWB antennas. The processor may be further configured to: estimate a relative position between the user terminal and the at least one of the first objects using the three or more UWB antennas of the user terminal and the at least one of the first objects; and set, based on the relative position, the first objects to the first nodes, and generate the first graph setting the connection relationships between the first objects to the first edges.

The processor may be further configured to: generate the first nodes of the first graph corresponding to the first UWB network using the first objects; register information corresponding to the target user and the first objects as information of the first nodes by classifying the information corresponding to the target user and the first objects; and configure the first UWB network by generating the first edges of the first graph, based on connection relationships between the first objects and the information of the first nodes.

The second UWB network may be configured to set, to second nodes, second objects dependent on the multi-user, wherein the second objects comprise either one or both of a UWB sensor and a UWB tag, by a second graph setting connection relationships between the second objects to second edges. The processor may be further configured to generate third edges setting connection relationships between the first nodes and the second nodes, based on relative positions between the first nodes and the second nodes, and connect the first UWB network to the second UWB network by connecting the second nodes to the first nodes of the first graph by the third edges.

Other features and aspects will be apparent from the following detailed description, the drawings, and the claims.

Figure 1:
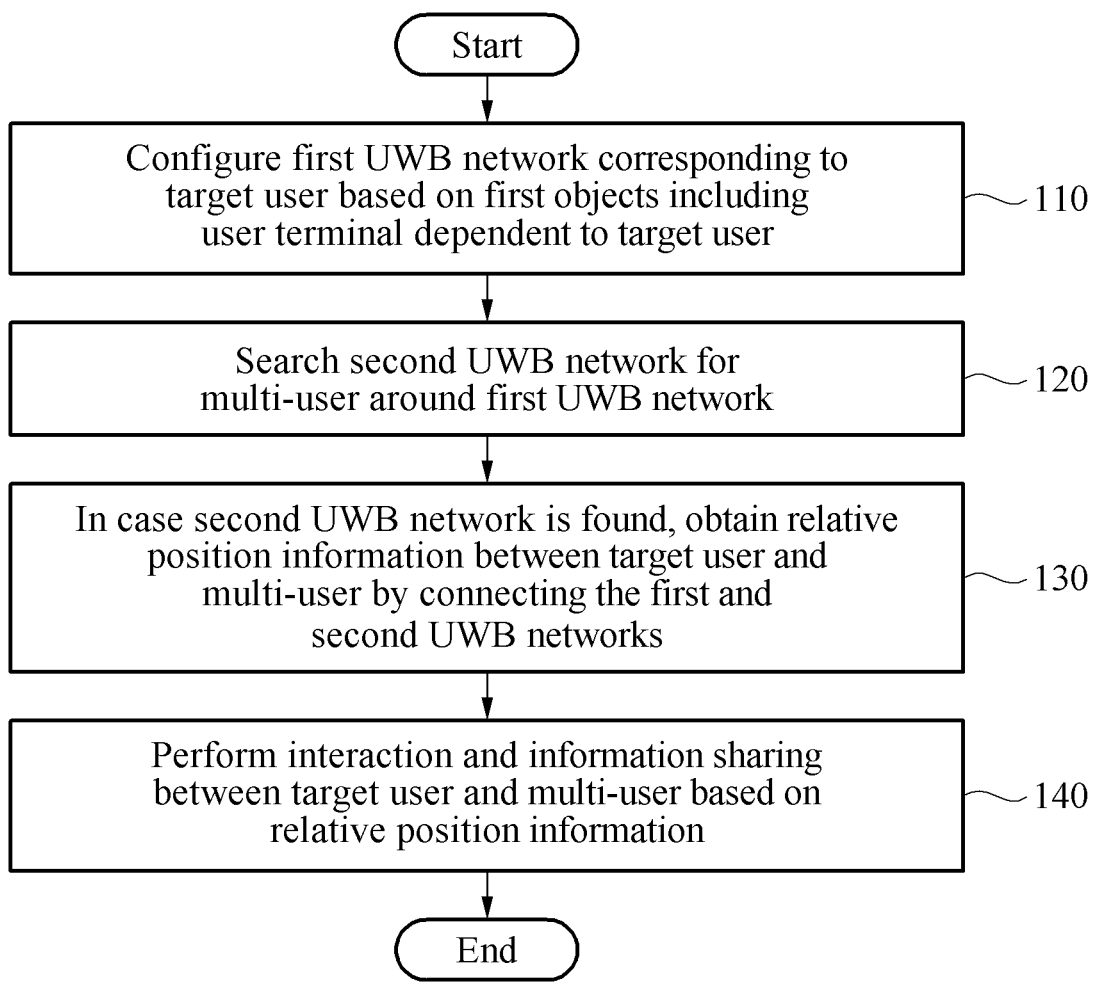
FIG. 1 illustrates an example of an operating method of a user terminal.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "Includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an operating method of a user terminal. Referring to FIG. 1, the user terminal may perform interaction and information sharing between users through operations 110 to 140. For example, the user terminal may be implemented as at least one of, for example, a mobile device, such as a mobile phone, a smartphone, a personal digital assistant (PDA), a netbook, a tablet computer, a laptop computer, and the like, a wearable device such as a smart watch, a smart band, smart glasses, and the like, a home appliance, such as a television (TV), a smart TV, a refrigerator, and the like, a security device, such as a door lock and the like, a medical device, and at least a portion of a smart vehicle. However, the example embodiments are not necessarily limited thereto.

In operation 110, the user terminal may configure a first ultra-wide band (UWB) network corresponding to a target user, based on first objects, including the user terminal dependent on the target user. Here, "objects dependent on" the target user may be understood as objects comprehensively including the user terminal used by the target user, an object connected to the user terminal of the target user, and/or an object owned by the target user. Hereinafter, for ease of description, objects dependent on the target user may be referred to as the "first object(s)", and objects dependent on a user other than the target user may be referred to as "second object(s)".

The first object, for example, may include a UWB communication module including at least one of a UWB sensor, a UWB antenna, and a UWB tag. The first object may include one or a plurality of UWB sensors, UWB antennas, and UWB tags.

The first object may include a head mounted display (HMD) in which the UWB communication module is installed, a smart glass, a mobile device, a wearable device, an Internet of Things (IoT) device in which a UWB tag is installed, and an object in which the UWB tag is installed. However, the example embodiments are not necessarily limited thereto.

A UWB network may use a significantly wide bandwidth of approximately 500 MHz in a 3.1 GHz to 10.6 GHz frequency range. A UWB technique may be a wireless communication technique using an ultra-wide bandwidth, and the user terminal may perform fine distance measurement and/or identifying position information through the UWB technique.

Figure 2:
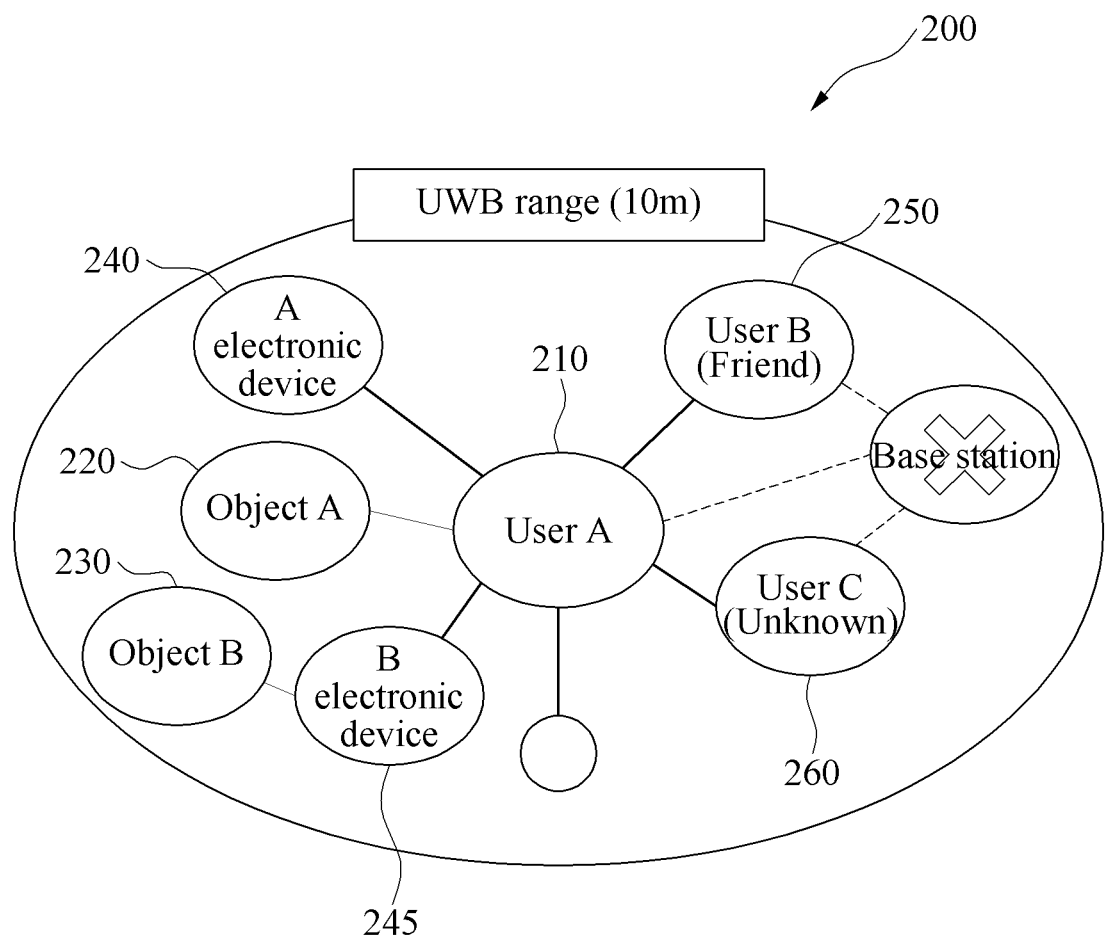
FIG. 2 illustrates an example of an ultra-wide band (UWB) network.

In operation 110, the user terminal may set first objects respectively to first nodes, and may configure a first UWB network by a first graph that sets a connection relationship between the first objects to first edges. An example of the UWB network may be represented by FIG. 2 shown below.

The user terminal and at least one of the first objects may each include three or more UWB antennas. In this case, in operation 110, the user terminal may estimate a relative position, including a position and a direction, between the user terminal and at least one of the objects using three or more of the UWB antennas. A user terminal may estimate a relative position between the user terminal and at least one of the objects with a high accuracy within 10 cm to 10 m through the UWB network, and may estimate a direction of the object based on the user terminal, using an angle of arrival (AoA). In addition, the user terminal may improve the accuracy of estimating a position between the user terminal and at least one of the objects by together using various sensors (for example, a visual sensor, an inertial measurement unit (IMU) sensor, and a global positioning system (GPS) sensor) provided in the user terminal.

The user terminal may set the first objects to the first nodes based on the estimated relative position, and may generate the first graph that sets connection relationships between the first objects to the first edges. A method of configuring the first UWB network by the user terminal is described in more detail with reference to FIG. 3.

In operation 120, the user terminal may search for a second UWB network adjacent to the first UWB network for a multi-user. The user terminal may search for the second UWB network adjacent to the first UWB network by modifying the information of the first nodes by allowing access to the position information of the first nodes. The user terminal, for example, may search for the second UWB network by detecting another object, including a UWB communication module within 10 m, which is a communication range of the first UWB network. Here, the other object may correspond to an object not registered in the first UWB network. The second UWB network, for example, may set second objects dependent on the multi-user to second nodes, and may be configured by a second graph that sets connection relationships between the second objects to second edges. The second objects may include at least one of a UBW sensor, a UWB tag, and a UWB antenna.

In operation 120, the user terminal may obtain absolute position information of the target user from a base station serving the user terminal, and more desirably, may obtain the absolute position information of the user terminal, provided by the target user. In this case, the user terminal may search for the second UWB network for the multi-user considering the relative position estimated in operation 110 and the absolute position information of the target user.

Here, depending on the distance to the user terminal, the base station serving the user terminal may be set as a node of the first UWB network and may be set as a node of the second UWB network adjacent to the first UWB network. For example, in case the base station serving the user terminal is located within a communication range of the first UWB network, the base station may be set to a first node of the first UWB network. On the other hand, in case the base station serving the user terminal is located within a communication range of the second UWB network adjacent to the first UWB network, the base station may be set to a second node of the second UWB network.

In operation 130, in case the second UWB network is found, the user terminal may obtain relative position information between the target user and the multi-user by connecting the first UWB network to the second UWB network. A method of obtaining relative position information between the target user and the multi-user by the user terminal is described in more detail with reference to FIG. 4.

In operation 130, the user terminal may adjust the relative position information between the target user and the multi-user, based on relative positions between the first nodes and the second nodes. A method of adjusting the relative position information between the target user and the multi-user by the user terminal is described in more detail with reference to FIG. 5.

In operation 140, the user terminal may perform interaction and information sharing between the target user and the multi-user, based on the relative position information obtained in operation 130. The user terminal, for example, may perform authentication on the target user and any one of the first and second objects based on the relative position information, may provide a position-based service to the target user, may generate a community between the target user and the multi-user, may provide a conversation service between the target user and the multi-user, may provide announcement information to the target user and the multi-user, or may display user information of any one of the target user and the multi-user. However, the example embodiments are not necessarily limited thereto.

In addition, in case the absolute position information of the target user is obtained from the base station serving the user terminal in operation 120, in operation 140, the user terminal may determine an absolute position of the target user and an absolute position of the multi-user using a map, based on the absolute position information of the target user. The user terminal may perform interaction and information sharing between the target user and the multi-user using the absolute positions of the target user and the multi-user determined based on the map.

An example of performing interaction and information sharing between the target user and the multi-user based on the UWB network-based relative position information by the user terminal without assistance from the map or the base station is described in more detail with reference to FIG. 6. In addition, an example of performing interaction and information sharing between the target user and the multi-user by obtaining the absolute position information of the target user from the base station by the user terminal is described in more detail with reference to FIG. 7.

In addition, various examples of expanding the communication range of the UWB network by the user terminal and performing interaction and information sharing between users based on the UWB network are described in more detail with reference to FIGS. 8 to 10.

FIG. 2 illustrates an example of a UWB network. Referring to FIG. 2, a user terminal 210 of User A within a communication range (for example, 10 m) of a UWB network 200, a user terminal 250 of User B, and a user terminal 260 of User C are illustrated. Here, User B may be a friend of User A, who is a target user configuring the UWB network. For example, User B may be automatically connected to the UWB network 200 via an application installed both in the user terminal 210 of User A and the user terminal 250 of User B to provide a social network service (SNS) messaging service. User C may be an unknown user to User A and may correspond to a user, whose UWB communication module provided in the user terminal 260 is detected by the user terminal 210, connected to the UWB network 200.

Not only the user terminal 210, which is currently used by User A, but also an Object A 220 owned by User A, an electronic device A 240, an electronic device B 245, and an Object B 230 connected to the electronic device B 245 may be dependent on User A.

The user terminal 210, the Object A 220, the Object B 230, the electronic device A 240, and/or the electronic device B 245 may include a UWB communication module including at least one of a UWB sensor, a UWB antenna, and a UWB tag.

The user terminal 210 may perform interaction and information sharing between the target user (for example, User A) and the multi-user (for example, User B and User C) by a method of estimating relative position information between a plurality of users using a UWB communication module, not by a method of estimating a current position of the user terminal 210 on an anchor-based absolute coordinate system, such as a vision sensor or a base station.

The user terminal 210 may estimate a relative position of an object-to-object dependent on User A, who is the target user, and/or a relative position between the user terminal 210 dependent on the target user and the user terminals 250 and 260 dependent on other users. The user terminal 210, for example, may set the Object A 220 dependent on the target user, the Object B 230, the electronic device A 240, the electronic device B 245, and/or the user terminals 250 and 260 dependent on other users to nodes, and may configure the UWB network 200 by a graph that sets connection relationships between nodes to edges. Here, the user terminal 210 currently used by User A, the Object A 220 owned by User A, the electronic device A 240, and the electronic device B 245 may be set to upper nodes in the graph, and the Object B 230 connected to the electronic device B 245 may be set to a lower node of a node corresponding to the electronic device B 245. For example, the connection relationship between nodes in the graph may be set based on the relative position information, including estimated relative position and direction between the nodes, and based on whether information of the corresponding node is disclosed, and the setting may be removed.

In the UWB network 200, the user terminal 210 may perform various interface applications, such as information sharing, information exchange, identification, and recognition, between the nodes via the edges.

As shown in FIG. 2, in case the UWB network 200 is configured by multi-users (for example, User A, User B, and User C), recognition and/or interaction may be performed with the multi-users within not only an area corresponding to a typical UWB range (for example, 10 m) based on a predetermined user (for example, User A) but also within a visual range wider than the UWB range.

For example, by connecting objects dependent on each user by applying Vehicle To Everything (V2X) technology of a vehicle and/or ad-hoc network technology of a mobile device to the UWB network 200 together, information sharing and/or information exchange between users within a wider area than the UWB range, which is a communication range of the UWB network 200, may be allowed. Here, V2X technology may be technology in a vehicle that exchanges information with an object in which infrastructure is built, such as another vehicle, a road, and a structure via wire-wireless networks, and may include for example, vehicle-to-vehicle (V2V), vehicle-to-infrastructure (V2I), vehicle-to-nomadic device (V2N), vehicle-to-pedestrian (V2P), and the like. Ad-hoc network technology may autonomously configure a network by nodes; in other words, may configure the network without a basic network device, such as a base station or an access point for configuring and maintaining the network. Nodes of an ad-hoc network may communicate with each other using a wireless interface, and may overcome a limitation in a communication distance of the wireless interface by a multi-hop routing function. Since the nodes may freely move in the ad-hoc network, network topology may dynamically change. More specifically, the ad-hoc network may include a form that terminals corresponding to the nodes are connected with each other, and may allow communication between terminals at a distance by terminals therebetween performing a repeater function.

The user terminal 210 may obtain position information on the absolute coordinate system by receiving the position information of the user terminal 210 connected to a building or a base station within the visual range through connection with other users (more specifically, user devices of other users) via V2X technology of a vehicle and/or ad-hoc network technology, without direct network connection with the base station or the building in the UWB range (for example, 10 m), which is the communication range of the UWB network 200. In this case, based on the position information on the absolute coordinate system, the user terminal 210 may enable a UI/UX application based on interaction and information sharing between additional users.

The user terminal 210 may estimate a position with high accuracy within 10 m to 10 cm through the UWB network 200, and may estimate a direction together with the position using an AoA. In addition, the user terminal 210 may improve the accuracy of position estimation by jointly using other sensors (for example, a visual sensor, an IMU sensor, and a sensor based on another network (including GPS)).

Figure 3:
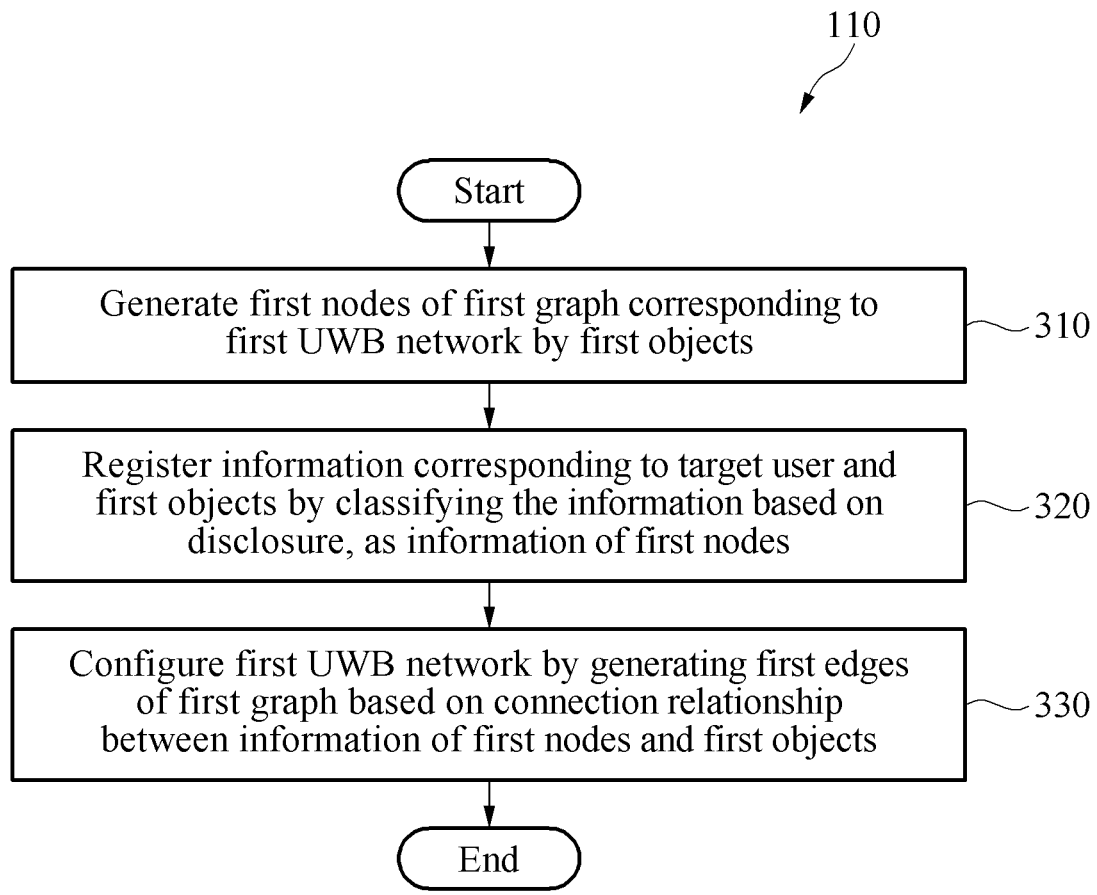
FIG. 3 illustrates an example of a method of configuring a first UWB network.

FIG. 3 illustrates an example of a method of configuring a first UWB network. Referring to FIG. 3, a user terminal may configure a first UWB network through operations 310 to 330.

In operation 310, the user terminal may generate first nodes of a first graph corresponding to the first UWB network by first objects. The user terminal, for example, may estimate a relative position between the user terminal and an object by triangulation using three or more UWB antennas, respectively included in the object dependent on the user and the user terminal. The user terminal may set the first nodes respectively corresponding to the first objects in the first graph based on the estimated relative position. Here, the user terminal may set the positions of the first objects in the first graph to correspond to the estimated relative position.

In operation 320, the user terminal may register information corresponding to the target user and the first objects as information of the first nodes by classifying the information based on the disclosure of the information. Here, for each of the first nodes, node information such as a position of the corresponding node, identification (ID) information of the node, and personal information of a user to which the node belongs may be registered. However, the example embodiments are not necessarily limited thereto.

In operation 330, the user terminal may configure a first UWB network by generating first edges of the first graph, based on a connection relationship between the information of the first nodes and the first objects registered in operation 320. Here, the first edges may include edge information such as a relative position between the first nodes connected through a corresponding edge, relationship information between the first nodes connected through the corresponding edge, disclosure of the information of the first nodes connected through the corresponding edge. However, the example embodiments are not necessarily limited thereto. Here, "relationship information between nodes" may correspond to information showing a hierarchy or connection strength between nodes, for example, which of the first nodes is an upper node, and which of the first nodes is a lower node connected to the upper node.

Figure 4:
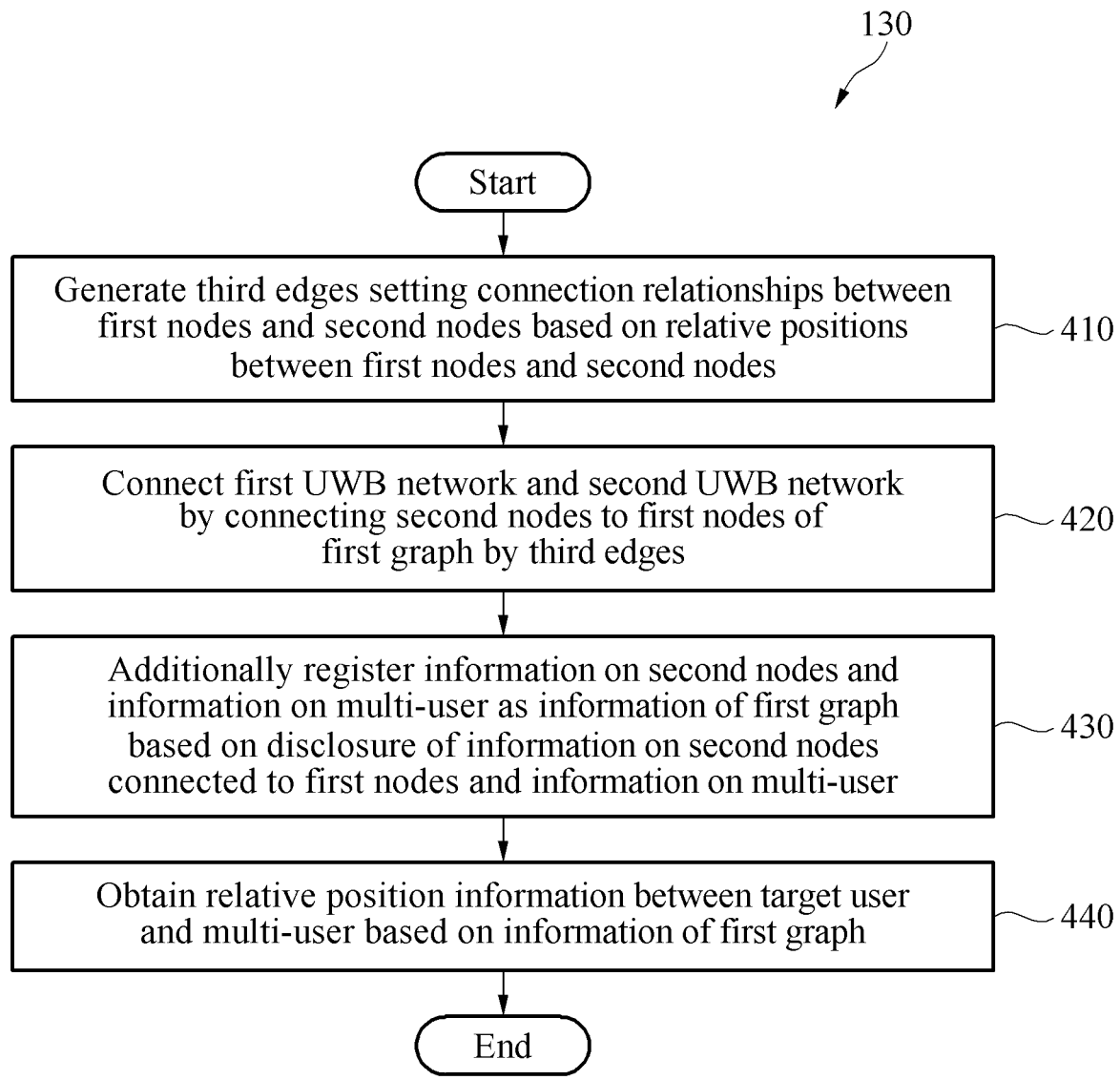
FIG. 4 illustrates an example of a method of obtaining relative position information.

FIG. 4 illustrates an example of a method of obtaining relative position information. Referring to FIG. 4, a user terminal may obtain relative position information between users through operations 410 to 440.

In operation 410, the user terminal may generate third edges configured to set connection relationships between first nodes and second nodes based on relative positions between the first and second nodes.

In operation 420, the user terminal may connect a first UWB network to a second UWB network by connecting the second nodes to the first nodes of a first graph by the third edges generated in operation 410.

In operation 430, the user terminal may additionally register information on the second nodes and information on a multi-user based on the disclosure of the information on the second nodes connected to the first nodes through operation 420 and/or disclosure of the information on the multi-user on which the second nodes are dependent. For example, in case the information on the second nodes and/or the information on the multi-user is modified, the user terminal may modify the information on the second nodes and the information on the multi-user, which are registered as information of the first graph.

In operation 440, the user terminal may obtain or estimate relative position information between a target user and the multi-user, based on the information of the first graph to which the information of the second nodes and the information of the multi-user are additionally registered in operation 430.

Figure 5:
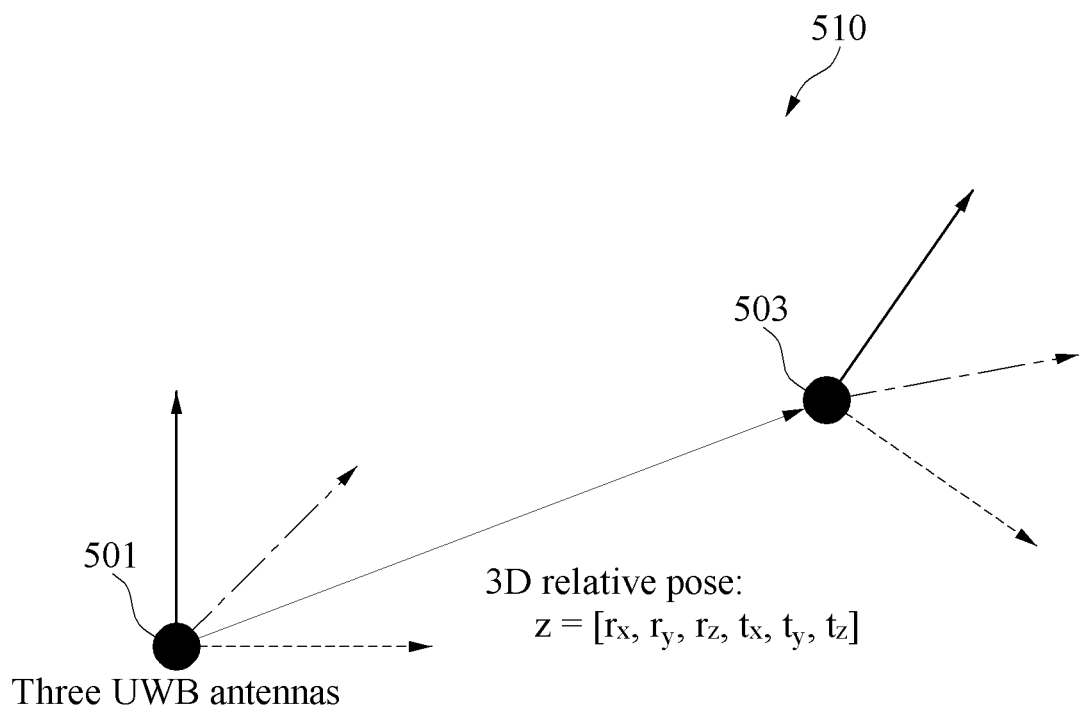
FIG. 5 illustrates an example of a method of obtaining relative position information between a target user and a multi-user.
Figure 5:
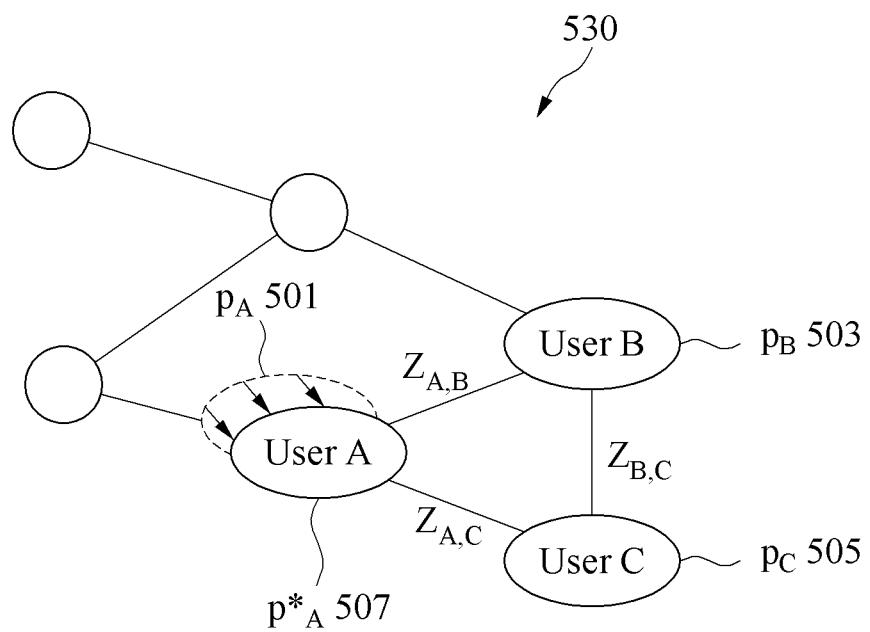

FIG. 5 illustrates an example of a method of obtaining relative position information between a target user and a multi-user.

Referring to FIG. 5, illustrated are Example 510 showing a 3D relative position between a position $P_A$ 501 of a device of User A and a position $P_B$ 503 of a device of User B and Example 530 showing an adjusted position $P^*_A$ 507 of the device of User A based on relative position information $z_{A,B}$, $z_{B,C}$, $z_{C,A}$ among the position $P_A$ 501 of the device of User A, the position $P_B$ 503 of the device of User B, and a position $P_C$ 505 of a device of User C.

For example, Example 530 may represent a case including the device of User B at the position $P_B$ 503 and the device of User C at the position $P_C$ 505 within a UWB communication range based on the position $P_A$ 501 of the device of User A. Here, in the UWB network, a position corresponding to each device may be represented by a position of a node, and may be defined as p=[$p_A$, $p_B$, $p_C$, ... ].

In addition, relative position information between devices included in the UWB network may be defined as Z=[$z_{A,B}$, $z_{B,C}$, $z_{C,A}$, ... ].

It is supposed that the device of User A at position $P_A$ 501 and the device of User B at position $P_B$ 503 in Example 510, and each include three UWB antennas.

In this case, the device of User A and the device of User B may observe a relative position Z, more specifically $\hat{z}_{i,j}=\hat{z}(p_i,p_j)$, between the device of User A and the device of User B using the three antennas provided in each of the devices. Hereinafter, $\hat{z}$ may represent an observation value (or, a measurement value) of the relative position.

In the UWB network, a distance may be measured using the travel time of UWB radio waves between two devices, and a direction and position may be measured by an AoA using the three antennas.

The measured relative position Z may be a 3D relative position of z=[rx,ry,rz,tx,ty,tz]6 degrees of freedom (DoF), including rotation and translation such as $\hat{z}=[\hat{r}_x,\hat{r}_y,\hat{r}_z,\hat{t}_x,\hat{t}_y,\hat{t}_z]$.

Through the process described above, when relative position information $\hat{Z}=[\hat{z}_{A,B}, \hat{z}_{B,C}, \hat{z}_{C,A}, ... ]$ between devices is measured, the position $P_A$ 501 of the device of User A may be moved to the adjusted position $P^*_A$ 507 optimized based on the relative position information Z.

The position $P_A$ 501 of the device of User A may be filtered by Equation 1 shown below. "Filtering" the position $P_A$ 501 may be understood as preventing rapid movement of the position $P_A$ 501 overtime.

$$p_t = \underset{p}{\mathrm{argmin}} \sum_i \|p_t - p_{t-1}\|_{\Sigma_{p_{t-1}}} + \sum_{i,j} \|z_t - \hat{z}_t(p_i, p_j)\|_{\Sigma_z} \quad \text{[Equation 1]}$$

Here, $p_t$ may denote an estimated position of a device at time t, $p_{t-1}$ may denote an estimated position of the device at time t−1 preceding the t time. In addition, $z_t$ may denote a relative position estimation value corresponding to an actual position of the device at time t, and $\hat{z}_t$ may denote a relative position observation value corresponding to the actual position of the device at time t.

For example, the position $P_A$ 501 filtered by Equation 1 may be optimized to the position $P^*_A$ 507 by Equation 2, shown below.

$$p^* = \underset{p}{\mathrm{argmin}} \sum_{i,j} \|z_{i,j} - \hat{z}_{i,j}\|_{\Sigma_z} \quad \text{[Equation 2]}$$

Here, $z_{i,j}$ may correspond to relative position information stored in an edge that connects node i to node j, and $\hat{z}_{i,j}$ may correspond to a relative position value that is actually observed between node i and node j.

By minimizing a difference between the relative position information stored in the edge and the observed position value by Equation 2, the position $P_A$ 501 of the device of User A may be adjusted to the optimized position $P^*_A$ 507.

Figure 6:
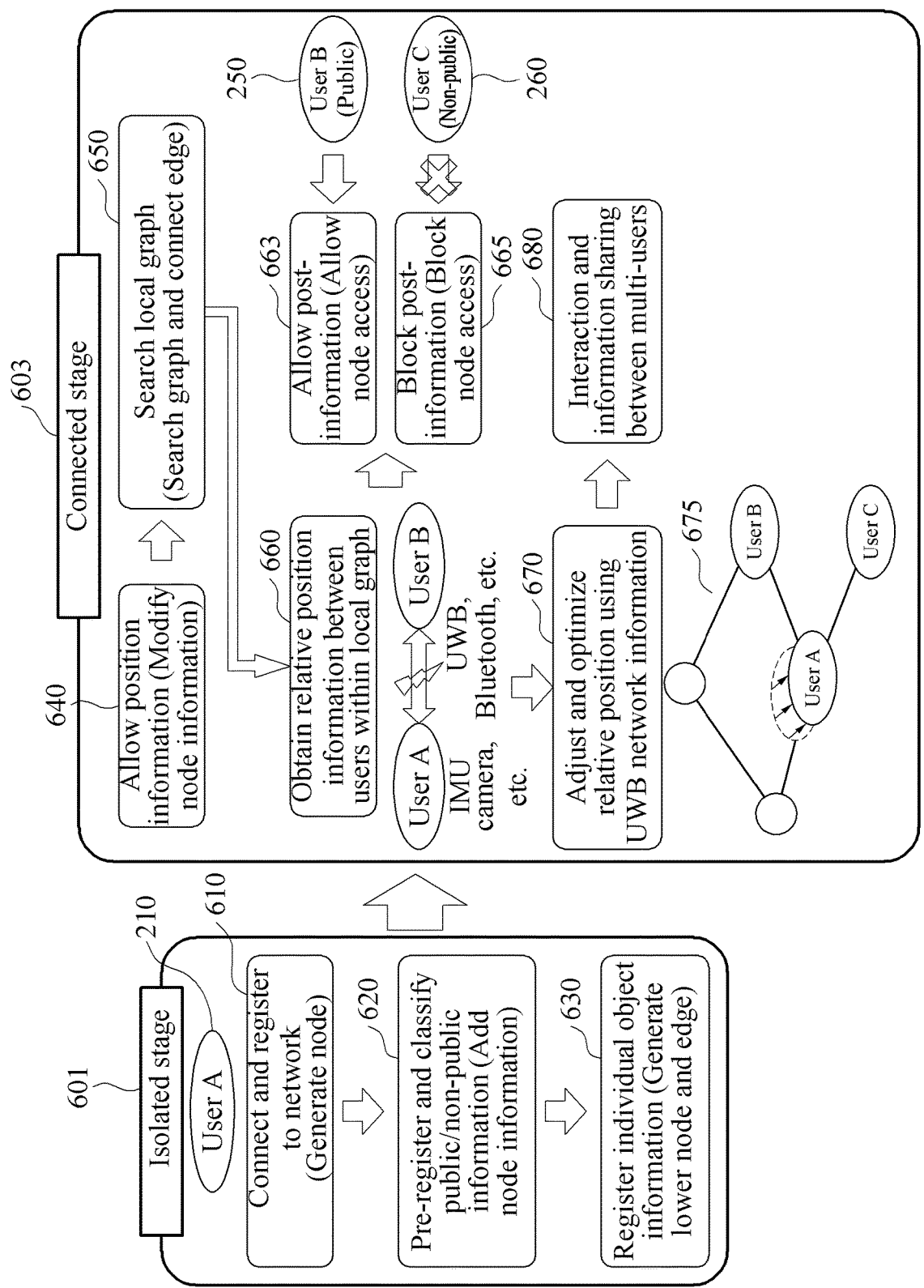
FIG. 6 illustrates an example of an operation of a user terminal in a first UWB network and a second UWB network.

FIG. 6 illustrates an example of an operation of a user terminal in a first UWB network and a second UWB network. Referring to FIG. 6, illustrated are an isolated stage 601, in which the user terminal 210 of User A configures a first UWB network, and a connected stage 603, in which interaction and information sharing between users are performed by connecting the first UWB network to a second UWB network for a multi-user adjacent to the first UWB network by the user terminal 210 of User A.

In the isolated stage 601, the user terminal 210, for example, may perform operations 610 to 630.

In operation 610, the user terminal 210 may connect to a UWB network and/or node registration for the UWB network. The user terminal 210 may generate a node for information sharing and exchange and register the generated node in the UWB network (for example, the first UWB network).

In operation 620, the user terminal 210 may register and/or add node information corresponding to the node generated in operation 610. The node information, for example, may include a user of an object corresponding to the node and/or information on the object corresponding to the node. The node information may be disclosed by the user and may include public information, which is set to be public, and non-public information, which is set to be private. Disclosure of the node information may be modified by user settings.

In operation 620, the user terminal 210 may pre-register the node information corresponding to the node, and then, may posteriorly classify the node information based on disclosure, or may pre-classify the node information corresponding to the node based on disclosure, and then, may store the classified node information.

In operation 630, the user terminal 210 may register individual object information, including an object owned by the user and/or an object connected to the user terminal 210, in the graph. Here, the individual object information may be configured in a form of a linked list of a lower node of the nodes (hereinafter, referred to as "the upper node") generated in operation 610 and edges connecting the upper node to the lower node, in the first UWB network. However, the example embodiments are not necessarily limited thereto.

In case the first UWB network for each individual user is configured in the isolated stage 601, the user terminal 210 may connect another UWB network (for example, the second UWB network for a multi-user) adjacent to the first UWB network to the first UWB network in the connected stage 603.

The user terminal 210 in the connected stage 603 may perform operations 640 to 680.

In operation 640, the user terminal 210 may allow access to position information of the first nodes in the first graph corresponding to the first UWB network so as to connect to another user adjacent to the first UWB network. Here, the user terminal 210 may allow another network to access to the position information of the first nodes by modifying the node information corresponding to the first nodes, more specifically, modifying the disclosure of the position information of the first nodes.

By allowing access to the position information of the first nodes, in operation 650, the user terminal 210 may search a local graph (hereinafter, referred to as "the second graph") corresponding to the other user (for example, the user terminal 250 of User B and/or the user terminal 260 of User C) adjacent to the first UWB network. The user terminal 210 may search the second graph corresponding to the second UWB network by searching for a device, in which a UWB network communication module is installed, around the first UWB network.

In operation 650, when searching for the second graph corresponding to the other user is completed, the user terminal 210 may add the second nodes corresponding to the other user to the first graph by connecting to the second graph, or may connect the first graph to the second graph. The user terminal 210 may connect the second UWB network to the first UWB network by connecting the second nodes corresponding to the other user to the first nodes by edges (for example, the third edges).

When the second graph is connected to the first graph through operation 650, in operation 660, the user terminal 210 may obtain relative position information between users (for example, User A, User B, and User C) configured in nodes within the local graph (for example, the first graph and the second graph). Here, the user terminal 210 may estimate a relative position between the graphs or all users within the network by using a device-to-device-based UWB network. In operation 660, the user terminal 210 may use an additional network, such as Bluetooth, than a UWB communication module, such as a UWB sensor, a UWB tag, and a UWB antenna, and/or may improve the estimation accuracy of the relative position information by using a camera, a visual sensor, and an inertial sensor included in the user terminal of each user.

Here, a setting for disclosure of node information of the nodes included in the local graph may be, for example, posteriorly modified after the isolated stage 601 described above. For example, in operation 663, in case User B and/or the node information corresponding to the user terminal 250 of User B is posteriorly modified to be disclosed by User B in the second graph, another network or another user may be allowed to access the node information of the corresponding node. Alternatively, in operation 665, in case User C and/or the node information corresponding to the user terminal 260 of User C is posteriorly modified to be private by User C in the second graph, another network or another user may be blocked from accessing the node information of the corresponding node.

In operation 670, the user terminal 210 may fine-tune the relative position information obtained in operation 660 by using information (for example, relative positions of nodes configuring the first graph and the second graph) of the UWB network (for example, the first UWB network and the second UWB network) connected through the process described above. The user terminal 210 may adjust one or more positions of a user (for example, User A) as Example 675 through filtering and/or optimization within the UWB network.

In operation 680, the user terminal 210 may perform interaction and information sharing between multi-users by using the relative position information adjusted in operation 670.

Figure 7:
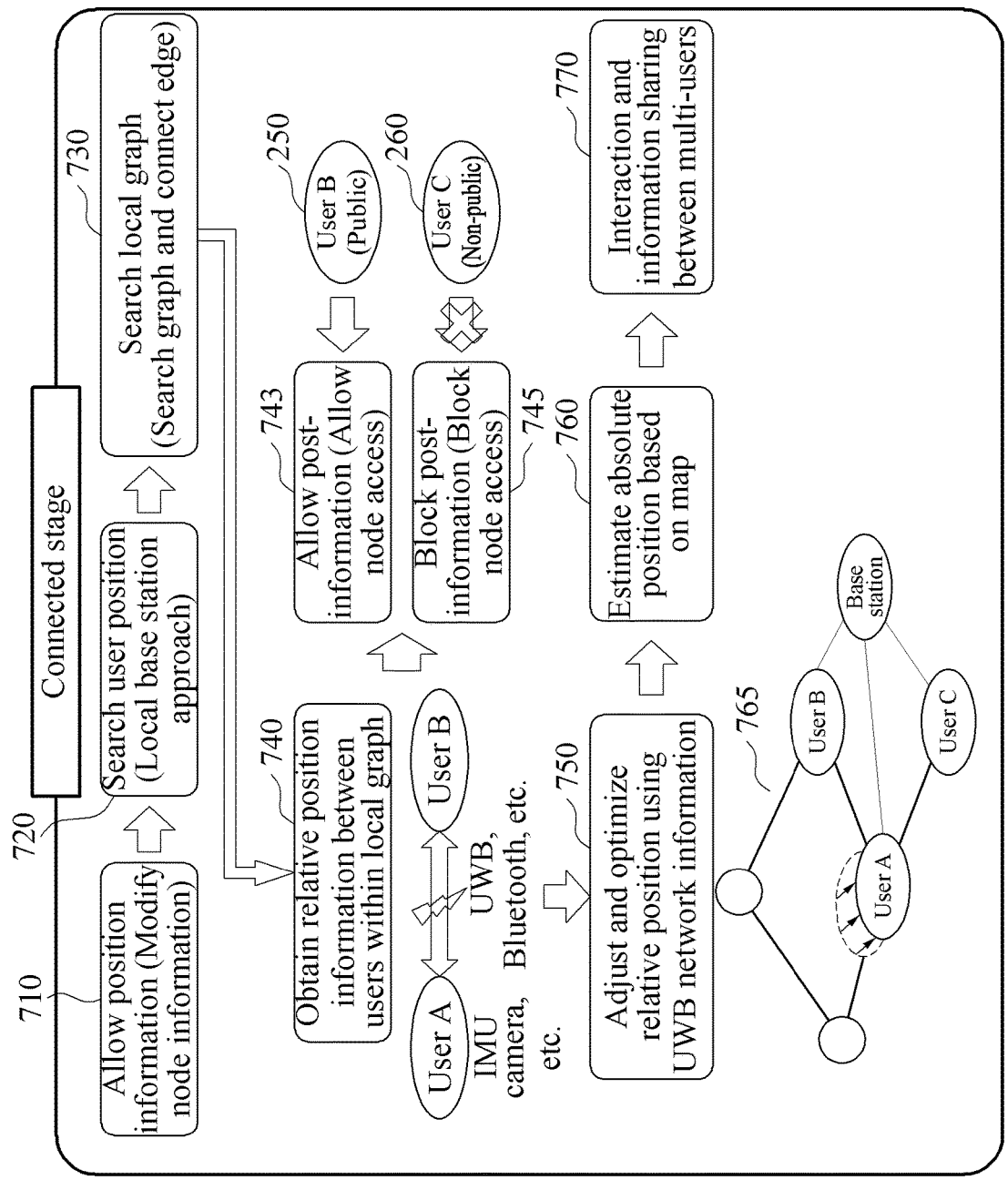
FIG. 7 illustrates another example of an operation of a user terminal in a first UWB network and a second UWB network.

FIG. 7 illustrates another example of an operation of a user terminal in a first UWB network and a second UWB network. Referring to FIG. 7, unlike the connected stage 603 shown in FIG. 6, a user terminal may perform operations of the connected stage by obtaining absolute position information from a base station through operations 710 to 770.

In operation 710, the user terminal may allow access to position information of first nodes in a first graph corresponding to a first UWB network so as to connect to another user adjacent to the first UWB network. Here, the user terminal may allow another network to access the position information of the first nodes by modifying node information corresponding to the first nodes, more specifically, modifying disclosure of the position information of the first nodes.

By allowing access to the position information of the first nodes, in operation 720, the user terminal may search for its position (for example, a user terminal of User A) by approaching an adjacent local base station by using a UWB communication module, such as a UWB sensor. The user terminal may obtain, from the local base station, position information on an absolute coordinate system (hereinafter, referred to as "absolute position information") corresponding to its position.

In operation 730, the user terminal may search a local graph (hereinafter, referred to as a "second graph") corresponding to another user (for example, User B and/or User C) adjacent to the first UWB network. The user terminal may search the second graph corresponding to the second UWB network by searching for a device, in which the UWB communication module is installed, around the first UWB network. In operation 730, when searching the second graph corresponding to the other user is completed, the user terminal may add second nodes corresponding to the other user to the first graph by connecting to the second graph, or may connect the first graph to the second graph. The user terminal may connect the second UWB network to the first UWB network by connecting the second nodes corresponding to the other user to the first nodes by edges (for example, the third edges). Here, as shown in Example 765, the user terminal may additionally generate a node corresponding to a position of the local base station found in operation 720.

In case the first graph is connected to the second graph through operation 730, in operation 740, the user terminal 210 may obtain relative position information between users (for example, User A, User B, and User C) configured in the nodes within the first graph and the second graph. The user terminal may estimate the relative positions of all users within a graph or a network by using a device-to-device-based UWB network. In operation 740, the user terminal may use an additional network, such as Bluetooth, than a UWB communication module, such as a UWB sensor, a UWB tag, and a UWB antenna, and/or may improve the estimation accuracy of the relative position information by using a camera, a visual sensor, and an inertial sensor included in the user terminal of each user.

Here, a setting for disclosure of node information of the nodes included in the local graph may be, for example, posteriorly modified after the isolated stage 601 described above. For example, in operation 743, in case User B and/or the node information corresponding to the user terminal 250 of User B is posteriorly modified to be disclosed by User B in the second graph, another network or another user may be allowed to access the node information of the corresponding node. Alternatively, in operation 745, in case User C and/or the node information corresponding to the user terminal 260 of User C is posteriorly modified to be private by User C in the second graph, another network or another user may be blocked from accessing the node information of the corresponding node.

In operation 750, the user terminal may fine-tune the relative position information obtained in operation 740 by using information (for example, relative positions of nodes configuring the first graph and the second graph) of the UWB network (for example, the first UWB network and the second UWB network) connected through the process described above. The user terminal may adjust one or more positions of a user (for example, User A) as Example 765 through filtering and/or optimization within the UWB network.

In operation 760, the user terminal may estimate the absolute positions of users based on a map by using the relative position information adjusted in operation 750 and/or the absolute position information obtained in operation 720.

In operation 770, the user terminal may perform interaction and information sharing between multi-users using the absolute positions estimated in operation 760.

Figure 8:
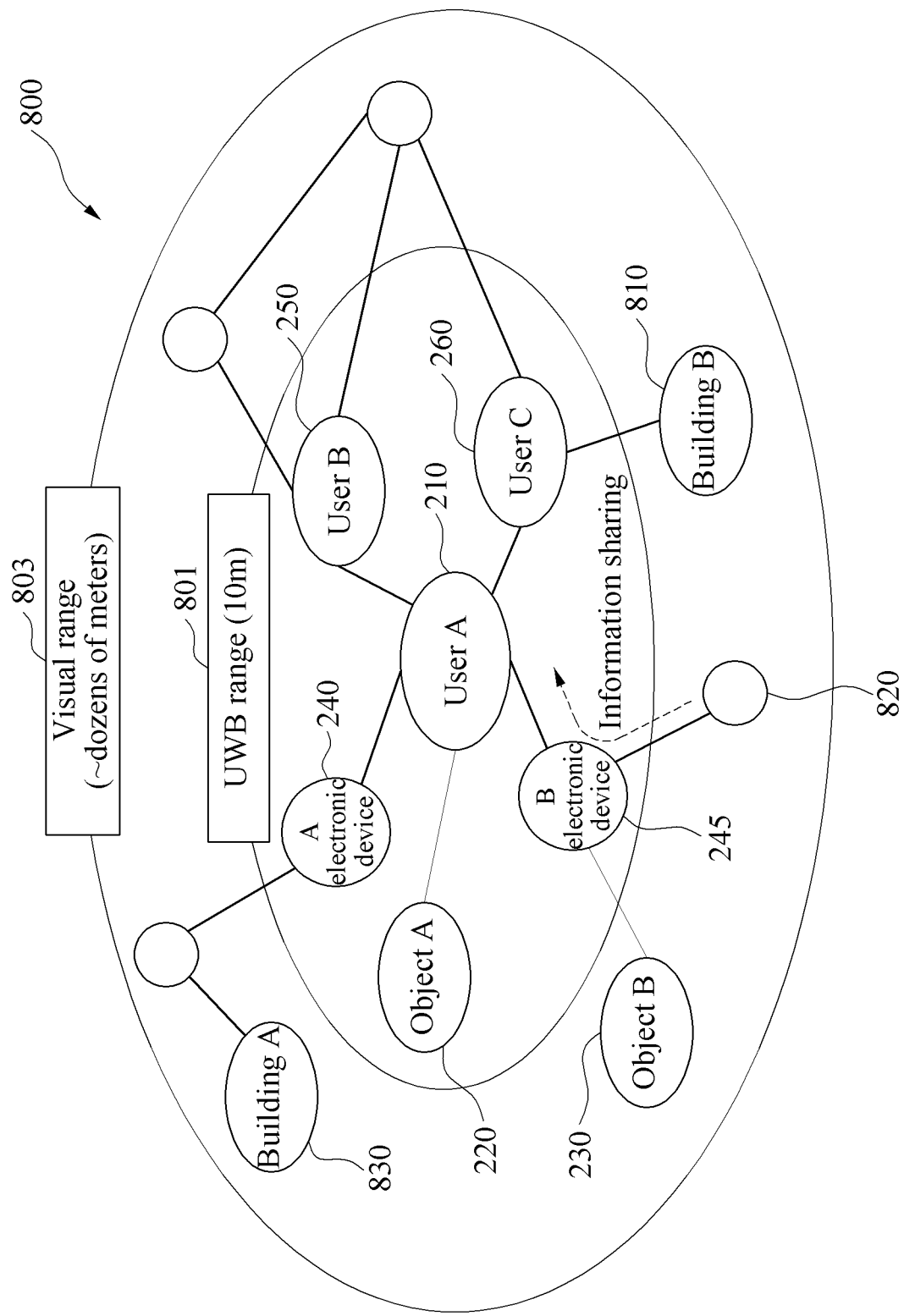
FIG. 8 illustrates an example of an expanded communication range of a UWB network.

FIG. 8 illustrates an example of an expanded communication range of a UWB network. Referring to FIG. 8, illustrated are a UWB range 801, which is an original communication range of a UWB network 800 and a visual range 803, which is an expanded communication range of the UWB network 800. The UWB range 801, which is the original communication range of the UWB network 800, may be, for example, 10 m, and the visual range 803, which is the expanded communication range, may be dozens of meters.

For example, the UWB network 800, including user terminals (for example, the user terminal 210 of User A, the user terminal 250 of User B, and the user terminal 260 of User C) of multi-users may be configured.

In this case, a communication range may be expanded to the visual range 803, which is wider than the UWB range 801, by connecting a network to not only an area corresponding to objects (for example, the Object A 220, the Object B 230, the electronic device A 240, and the electronic device B 245) included within the UWB range 801 based on a user terminal of a predetermined user (for example, the user terminal 210 of User A), but also to objects (for example, a building B 810) dependent on each user terminal (for example, the user terminal 250 of User B and the user terminal 260 of User C) of other users connected to the user terminal 210 of User A.

Here, a V2X technique of a vehicle and/or an ad-hoc network technique of a mobile device may be used for expanding the communication range. By using the V2X technique of a vehicle, and/or the ad-hoc network technique of a mobile device, the communication range of the UWB network 800 may be expanded to the visual range 803 by connecting objects (for example, the Object A 220, the Object B 230, the electronic device A 240, and the electronic device B 245) dependent on User A, objects (for example, an object 820 and a building A 830) connected to the objects dependent on User A, and objects (for example, the building B 810) dependent on the user terminal 260 of User C.

The example described that the UWB range 801 is expanded to the visual range 803 in case the user terminal 210 of User A is an augmented reality (AR) device of which an interface may be applicable to the visual range 803. However, the example embodiments are not necessarily limited thereto, and the communication range of the UWB network 800 may be expanded to a wider range than the visual range 803.

Figure 9:
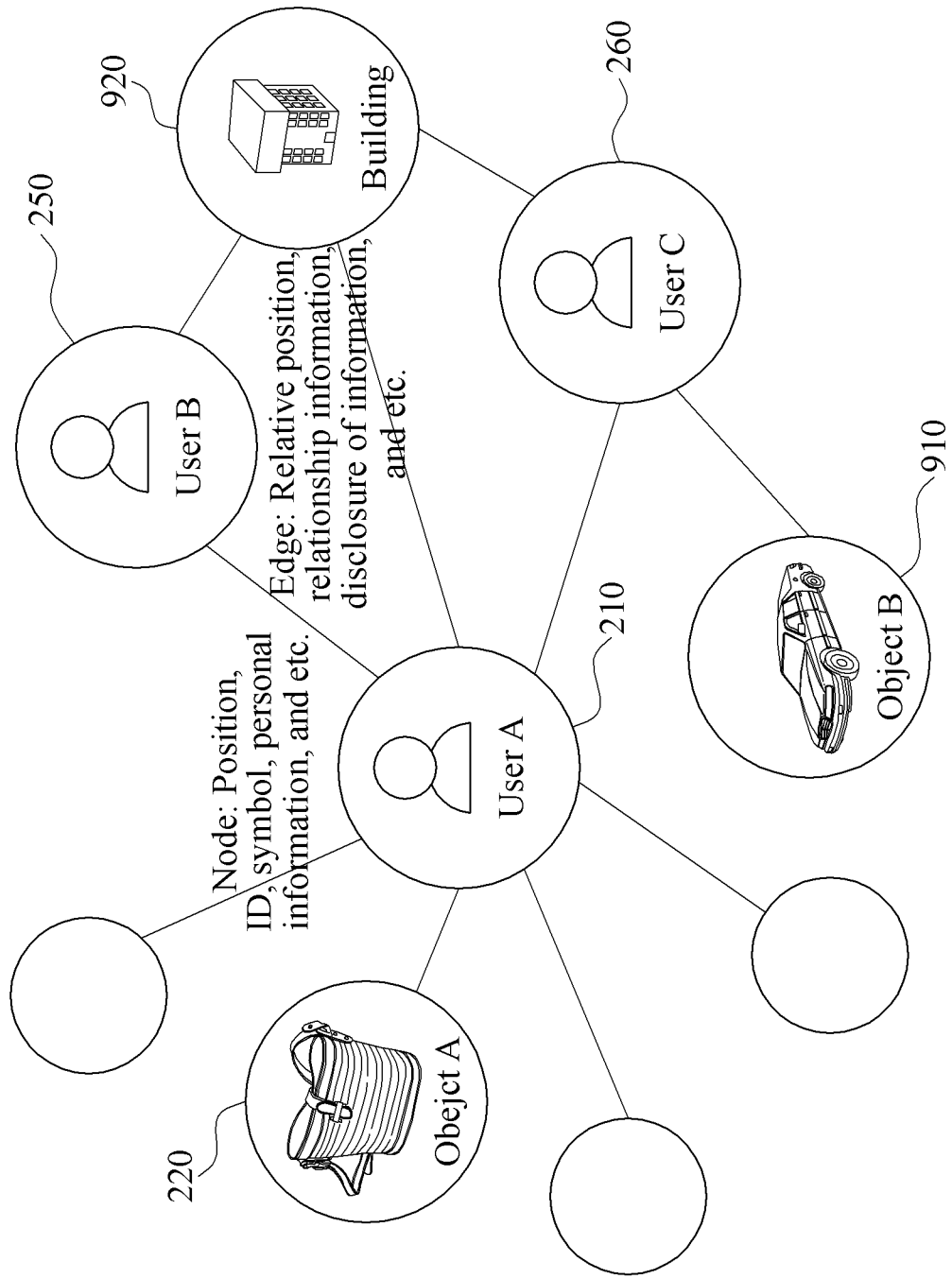
FIG. 9 illustrates an example of a situation where information is shared between multi-users in a UWB network.

FIG. 9 illustrates an example of a situation where information is shared between multi-users in a UWB network. Referring to FIG. 9, a situation in which information is shared between multi-users based on user A of the user terminal 210 is illustrated.

For example, in case a UWB network including user terminals (for example, the user terminal 210 of User A, the user terminal 250 of User B, and the user terminal 260 of User C) of multi-users is configured, information on a building 920 dependent on all of User A, User B, and User C, as well as information on the Object A 220 dependent on User A and information on an object B 910 dependent on User C, may be shared between the multi-users within the UWB network.

As described above, information on objects dependent on multi-users may be shared between the multi-users within the UWB network based on the disclosure of the corresponding information.

FIGS. 10A to 10D illustrate examples of various environments performing interaction and information sharing.

Figure 10A:
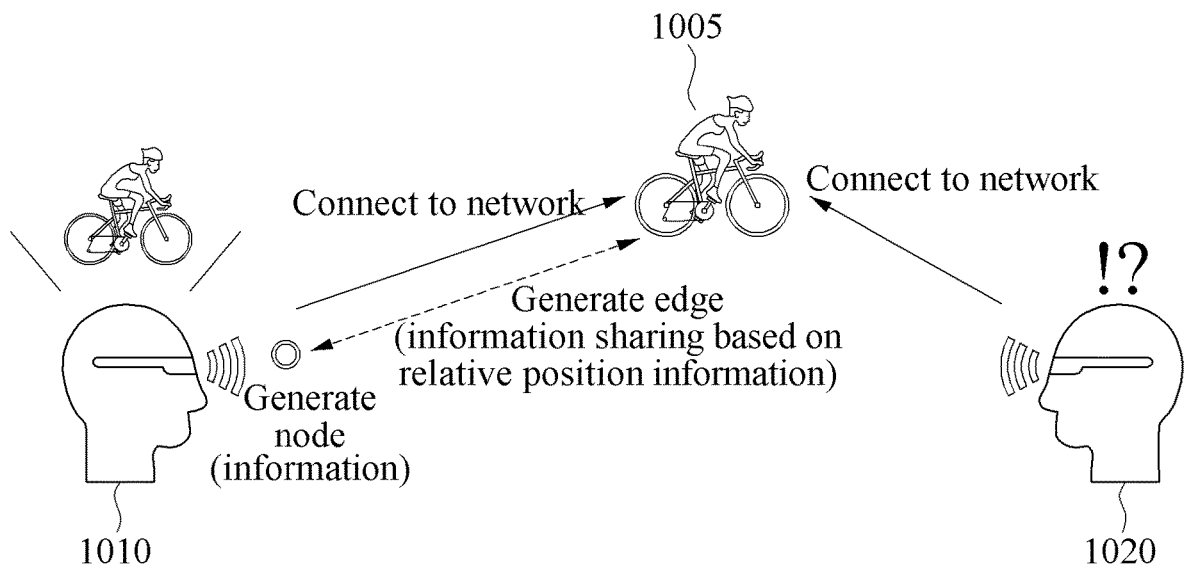
FIGS. 10A to 10D illustrate examples of various environments performing interaction and information sharing.

Referring to FIG. 10A, a situation where each user is experiencing various interface techniques through information sharing between user terminals of users, such as user A 1010 and user B 1020, using a UWB network, is illustrated.

For example, in case a bicycle 1005, to which a UWB tag is attached, is dependent on User A and a user terminal of the User A 1010 registers node information corresponding to the bicycle 1005 in the UWB network, a user terminal of the User B 1020 connected to the UWB network may share information corresponding to the bicycle 1005 with the user terminal of the User A 1010. Here, the user terminal of the User B 1020 may share, with the User A 1010, the information of the bicycle 1005 based on the relative position information of the User A 1010.

Figure 10B:
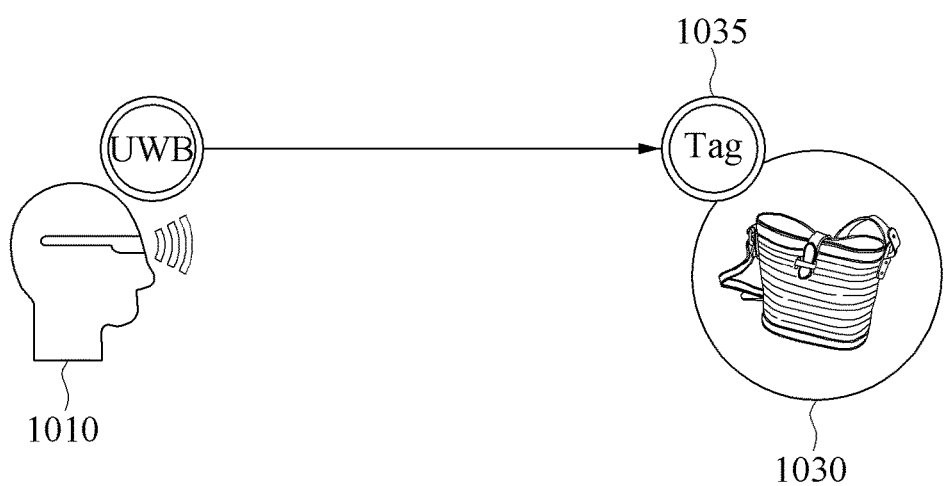

Referring to FIG. 10B, a situation in which the user terminal of the User A 1010 performs authentication on an object 1030 using the UWB network, is illustrated. The user terminal of the User A 1010 may recognize a UWB tag 1035 included in the object 1030 by using a UWB communication module, and may perform various authentication operations, such as manufacturer authentication, genuine product authentication, and recording, by obtaining information related to the object 1030.

Figure 10C:
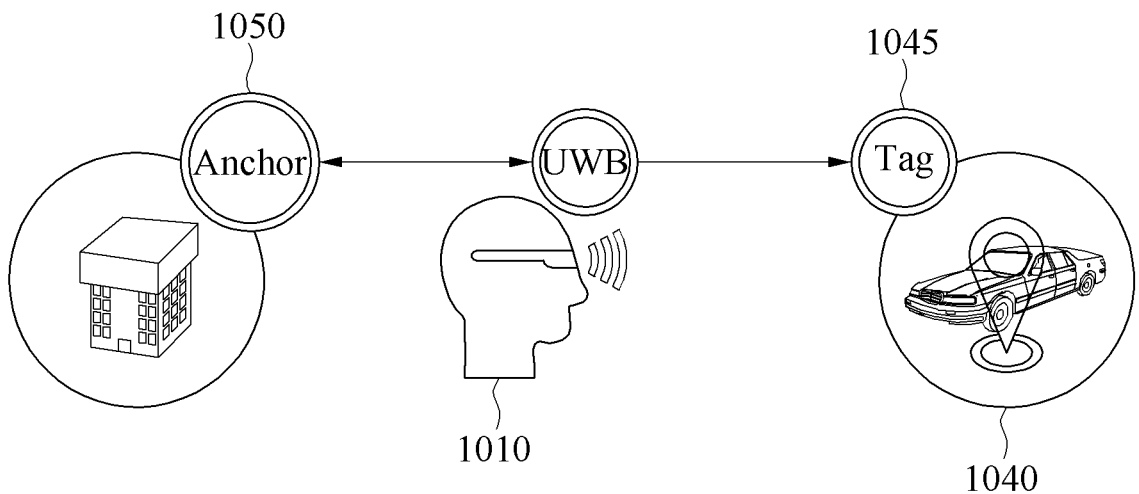

Referring to FIG. 10C, a situation where the user terminal of the User A 1010 obtains information by connecting to a local base station 1050 (hereinafter, referred to as an anchor).

The user terminal of the User A 1010 may obtain absolute position information of the user terminal from the anchor 1050, and may use a searching service, such as finding a pet, finding a piece of luggage, finding a parked location, tracking another user, indoor navigation, finding a seller, finding a table from which an order has been made, finding a bus, displaying a destination, and searching for a movie theater location, based on the obtained absolute position information. Here, an object 1040 corresponding to a target to be searched for may include a UWB tag 1045 including an absolute position on the absolute coordinate system.

Figure 10D:
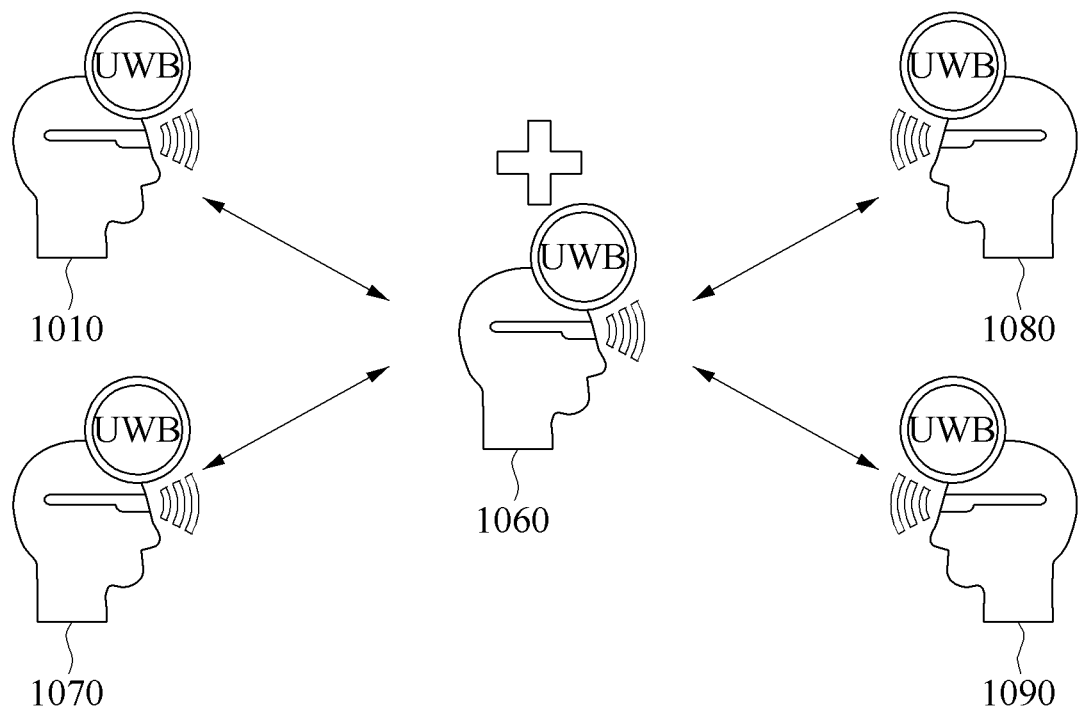

Referring to FIG. 10D, a situation in which user terminals of multi-users 1010, 1060, 1070, 1080, and 1090 configure a UWB network, and a new type of AR community is generated based on the UWB network is illustrated.

The user terminals of the multi-users 1010, 1060, 1070, 1080, and 1090 configuring the UWB network may display an AR alert related to safety and emergency, or may display a 3D sign and/or alert that may represent a symbol of individual users.

The user terminals of the multi-users 1010, 1060, 1070, 1080, and 1090 may, for example, generate an AR community based on information such as a safety caution (for example, a caution for the disabled, a caution for a child, and a caution for a senior), a vaccination status (a vaccine tag, or a vaccine passport), safety, crime prevention, an emergency, and displayed medical history of a patient.

In addition, the user terminals of the multi-users 1010, 1060, 1070, 1080, and 1090 may share an AR application program such as displaying a conversation message window and displaying an icon and an emoticon, for communication between the multi-users.

Figure 11:
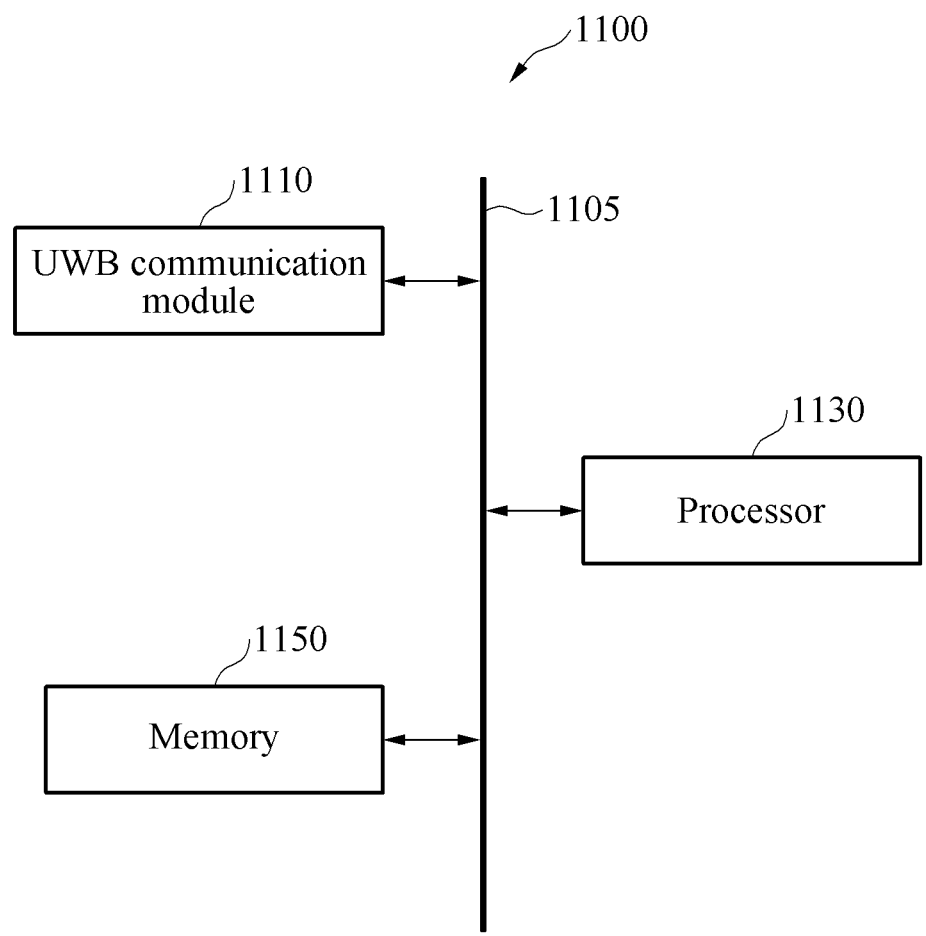
FIG. 11 illustrates an example of a user terminal.

FIG. 11 illustrates an example of a user terminal. Referring to FIG. 11, a user terminal 1100 may include a UWB communication module 1110, a processor 1130, and a memory 1150. The UWB communication module 1110, the processor 1130, and the memory 1150 may be connected to each other via a communication bus 1105.

For example, the user terminal 1100 may be implemented as at least one of, for example, a mobile device such as a mobile phone, a smartphone, a PDA, a netbook, a tablet computer, a laptop computer, and the like, a wearable device such as a smart watch, a smart band, smart glasses, and the like, a home appliance such as a television (TV), a smart TV, a refrigerator, and the like, a security device such as a door lock and the like, a medical device, and at least a portion of a smart vehicle. However, the example embodiments are not necessarily limited thereto.

The UWB communication module 1110 may include at least one of a UWB sensor, a UWB antenna, and a UWB tag.

The processor 1130 may configure a first UWB network corresponding to a target user, based on first objects, including a user terminal dependent on the target user. Here, the first objects may include a UWB communication module. The processor 1130 may set the first objects to first nodes, and may configure the first UWB network by a first graph that sets connection relationships between the first objects and first edges.

For example, at least one object of the first objects and the user terminal may include three or more UWB antennas, respectively. The processor 1130 may estimate a relative position between the user terminal and at least one of the objects by using the three or more UWB antennas. The processor 1130 may set the first objects to the first nodes based on the estimated relative position, and may generate the first graph that sets a connection relationship between the first objects and the first edges.

The processor 1130 may generate the first nodes of the first graph corresponding to the first UWB network by the first objects. The processor 1130 may register information corresponding to the target user and the first objects as information of the first nodes by classifying the information based on the disclosure of the information. The processor 1130 may configure the first UWB network by generating first edges of the first graph, based on connection relationships between the information of the first nodes and the first objects.

The processor 1130 may search for a second UWB network for a multi-user adjacent to the first UWB network. In case the second UWB network is found, the processor 1130 may obtain relative position information between the target user and the multi-user by connecting the first UWB network to the second UWB network. The second UWB network may set second objects dependent on a multi-user to second nodes, and may be configured by a second graph that sets connection relationships between the second objects and second edges. Here, the second objects may include any one of a UWB sensor and a UWB tag. The processor 1130 may generate third edges configured to set connection relationships between first nodes and second nodes based on relative positions between the first and second nodes. The processor 1130 may connect a first UWB network to a second UWB network by connecting the second nodes to the first nodes of a first graph by the third edges.

The processor 1130 may perform interaction and information sharing between the target user and the multi-user, based on the relative position.

The memory 1150 may store the relative position information, obtained by the processor 1130, between the target user and the multi-user. In addition, the memory 1150 may store information on the first nodes and the first edges configuring the first UWB network, information on the second nodes and the second edges configuring the second UWB network, and/or information on the third edges setting connection relationships between the first nodes and the second nodes.

In addition, the memory 1150 may store a variety of data and programs. The memory 1150 may include a volatile memory or a non-volatile memory. The memory 1150 may include a large-capacity storage medium such as a hard disk to store a variety of data.

In addition, the processor 1130 may execute a program, and may control the user terminal 1100. Program code to be executed by the processor 1130 may be stored in the memory 1150.

In addition, the processor 1130 may perform at least one method described with reference to FIGS. 1 through 10 or a scheme corresponding to the at least one method. The processor 1130 may be a hardware-implemented processing device having a physically structured circuit to execute desired operations. For example, the desired operations may include code or instructions in a program. A hardware-implemented user terminal, for example, the user terminal 1100, may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The user terminal, UWB communication module, memory, processor, user terminal 1100, UWB communication module 1110, memory 1150, processor 1130 in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of a user terminal, the operating method comprising:
    configuring a first ultra-wide band (UWB) network corresponding to a target user based on first objects comprising the user terminal dependent on the target user, a UWB communication module comprising any one or any combination of any two or more of a UWB sensor, a UWB antenna, and a UWB tag;
    searching for a second UWB network corresponding to a multi-user adjacent to the first UWB network;
    obtaining, based on a result of the searching, relative position information between the target user and the multi-user by connecting the first UWB network to the second UWB network; and
    performing, based on the relative position information, interaction and information sharing between the target user and the multi-user,
    wherein the configuring of the first UWB network comprises setting the first objects to first nodes, and configuring the first UWB network using a first graph setting connection relationships between the first objects to first edges of the first graph, and wherein each of the user terminal and at least one of the first objects comprises three or more UWB antennas, and the configuring of the first UWB network further comprises:

estimating a relative position between the user terminal and the first objects using the three or more UWB antennas of the user terminal and the at least one of the first objects; and setting the first objects to the first nodes based on the relative position, and generating the first graph.

2. The operating method of claim 1, wherein the configuring of the first UWB network further comprises:

generating the first nodes of the first graph corresponding to the first UWB network using the first objects;

registering information corresponding to the target user and the first objects as information of the first nodes by classifying the information corresponding to the target user and the first objects; and configuring the first UWB network by generating the first edges of the first graph, based on connection relationships between the first objects and the information of the first nodes.

3. The operating method of claim 1, wherein the searching for the second UWB network comprises searching for the second UWB network by modifying information of first nodes by allowing access to the relative position information of the first nodes.

4. The operating method of claim 1, wherein the second UWB network sets second objects dependent on the multi-user to second nodes, the second objects comprise either one or both of a UWB sensor and a UWB tag, and the second UWB network is configured by a second graph setting connection relationships between the second objects to second edges of the second graph.

5. The operating method of claim 4, wherein the obtaining of the relative position information comprises:

generating third edges setting connection relationships between the first nodes and the second nodes, based on relative positions between the first nodes and the second nodes; and connecting the first UWB network to the second UWB network by connecting the second nodes to the first nodes of the first graph by the third edges.

6. The operating method of claim 5, wherein the connecting of the first UWB network to the second UWB network comprises registering information on the second nodes and information on the multi-user as information of the first graph, based on disclosure of the information on the second nodes connected to the first nodes and the information on the multi-user.

7. The operating method of claim 6, further comprising: modifying the information on the second nodes and the information on the multi-user.

8. The operating method of claim 5, wherein the obtaining of the relative position information comprises adjusting the relative position information between the target user and the multi-user, based on relative positions between the first nodes and the second nodes.

9. The operating method of claim 1, wherein the performing of the interaction and information sharing comprises:

performing, based on the relative position information, authentication on any one of the target user, the first objects, and second objects;

providing, based on the relative position information, a position-based service to the target user;

generating, based on the relative position information, a community between the target user and the multi-user;

providing, based on the relative position information, a conversation service between the target user and the multi-user;

providing, based on the relative position information, announcement information to the target user and the multi-user; and displaying, based on the relative position information, information of any one of the target user and the multi-user.

10. The operating method of claim 1, wherein the searching for the second UWB network further comprises:

obtaining absolute position information of the target user from a base station serving the user terminal; and searching, based on position information of the target user, for the second UWB network for the multi-user.

11. The operating method of claim 10, wherein the performing of the interaction and information sharing further comprises:

determining based on the absolute position information of the target user, an absolute position of the target user and an absolute position of the multi-user using a map; and performing the interaction and information sharing between the target user and the multi-user using the absolute position of the target user and the absolute position of the multi-user.

12. The operating method of claim 1, wherein the first objects comprise any one or any combination of any two or more of a head mounted display (HMD) in which the UWB communication module is installed, a smart glass, a mobile device, a wearable device, and an internet of things (IoT) device in which the UWB tag is installed.

13. A non-transitory computer-readable storage medium storing instructions that, when executed by a processor, cause the processor to perform the method of claim 1.

14. A user terminal comprising:

an ultra-wide band (UWB) communication module comprising any one or any combination of any two or more of a UWB sensor, a UWB antenna, and a UWB tag; and a processor configured to:

configure a first UWB network corresponding to a target user based on first objects comprising the user terminal dependent on the target user, and the UWB communication module;

search for a second UWB network for a multi-user around the first UWB network;

obtain, based on a result of the search, relative position information between the target user and the multi-user by connecting the first UWB network to the second UWB network; and perform, based on the relative position information, interaction and information sharing between the target user and the multi-user, wherein the processor is further configured to set the first objects to first nodes, and configure the first UWB network using a first graph setting connection relationships between the first objects to first edges of the first graph, and wherein each of the user terminal and at least one of the first objects comprise three or more UWB antennas, and the processor is further configured to:

estimate a relative position between the user terminal and the at least one of the first objects using the three or more UWB antennas of the user terminal and the at least one of the first objects; and set, based on the relative position, the first objects to the first nodes, and generate the first graph setting the connection relationships between the first objects to the first edges.

15. The user terminal of claim 14, wherein the processor is further configured to:

generate the first nodes of the first graph corresponding to the first UWB network using the first objects;

register information corresponding to the target user and the first objects as information of the first nodes by classifying the information corresponding to the target user and the first objects; and configure the first UWB network by generating the first edges of the first graph, based on connection relationships between the first objects and the information of the first nodes.

16. The user terminal of claim 14, wherein the second UWB network is configured to set, to second nodes, second objects dependent on the multi-user, wherein the second objects comprise either one or both of a UWB sensor and a UWB tag, by a second graph setting connection relationships between the second objects to second edges, and the processor is further configured to generate third edges setting connection relationships between the first nodes and the second nodes, based on relative positions between the first nodes and the second nodes, and connect the first UWB network to the second UWB network by connecting the second nodes to the first nodes of the first graph by the third edges.

* * * * *